June 28, 1966 W. C. OSWALD 3,258,241
VEHICLE SEAT SUSPENSION
Filed Nov. 12, 1964 3 Sheets-Sheet 3
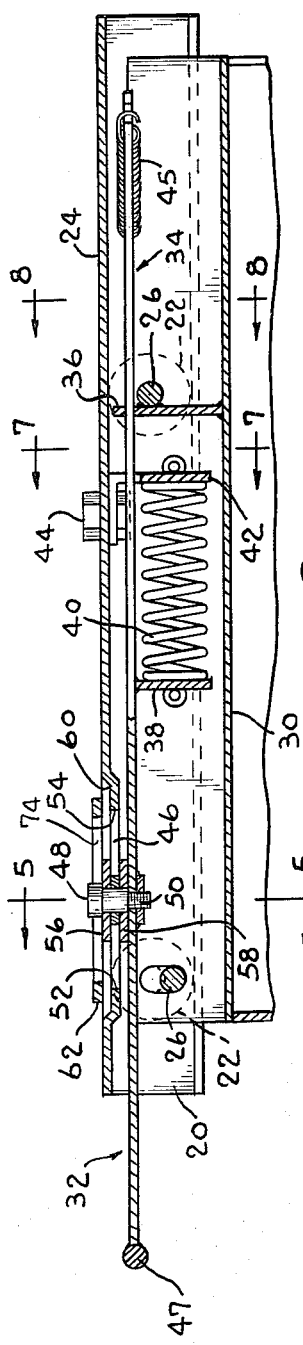
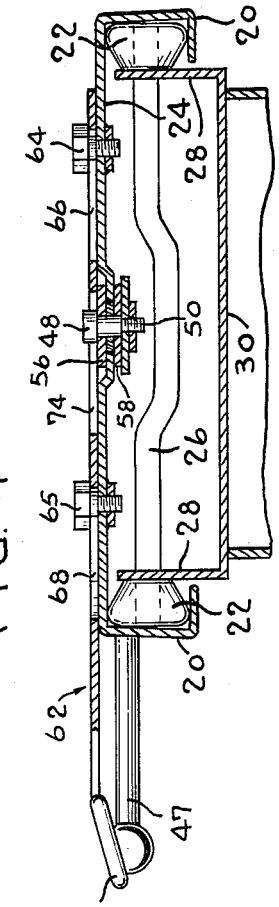
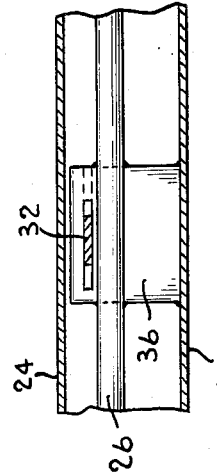
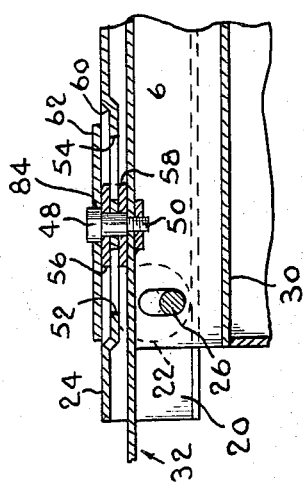
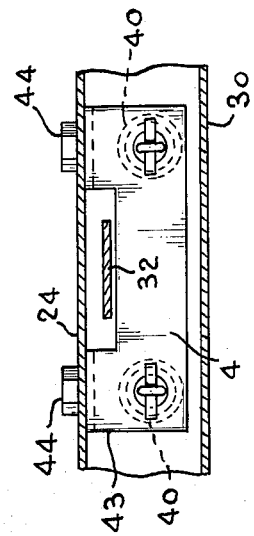
INVENTOR
WILLIAM C. OSWALD
BY Bayard H. Michael
ATTORNEY

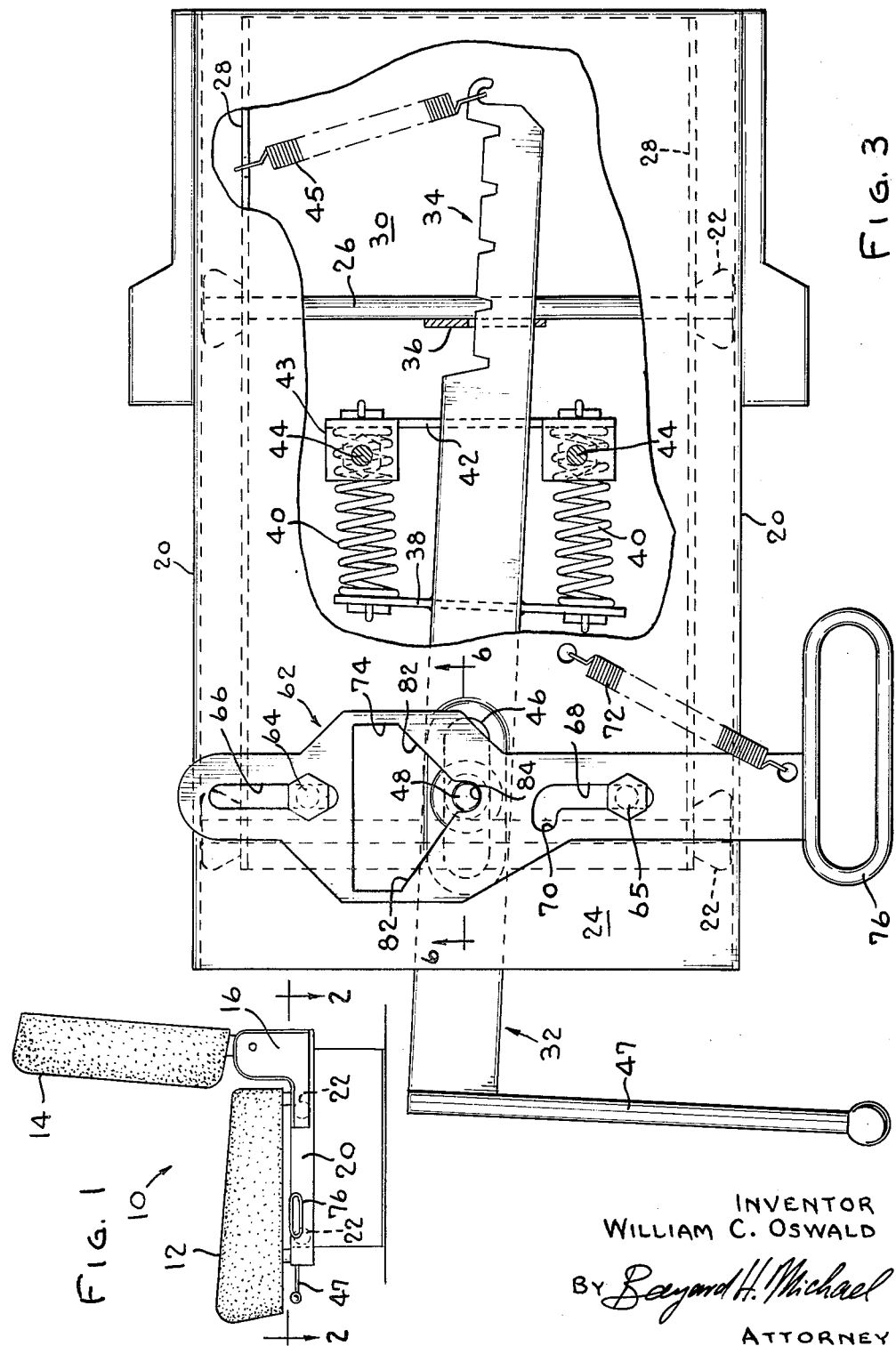

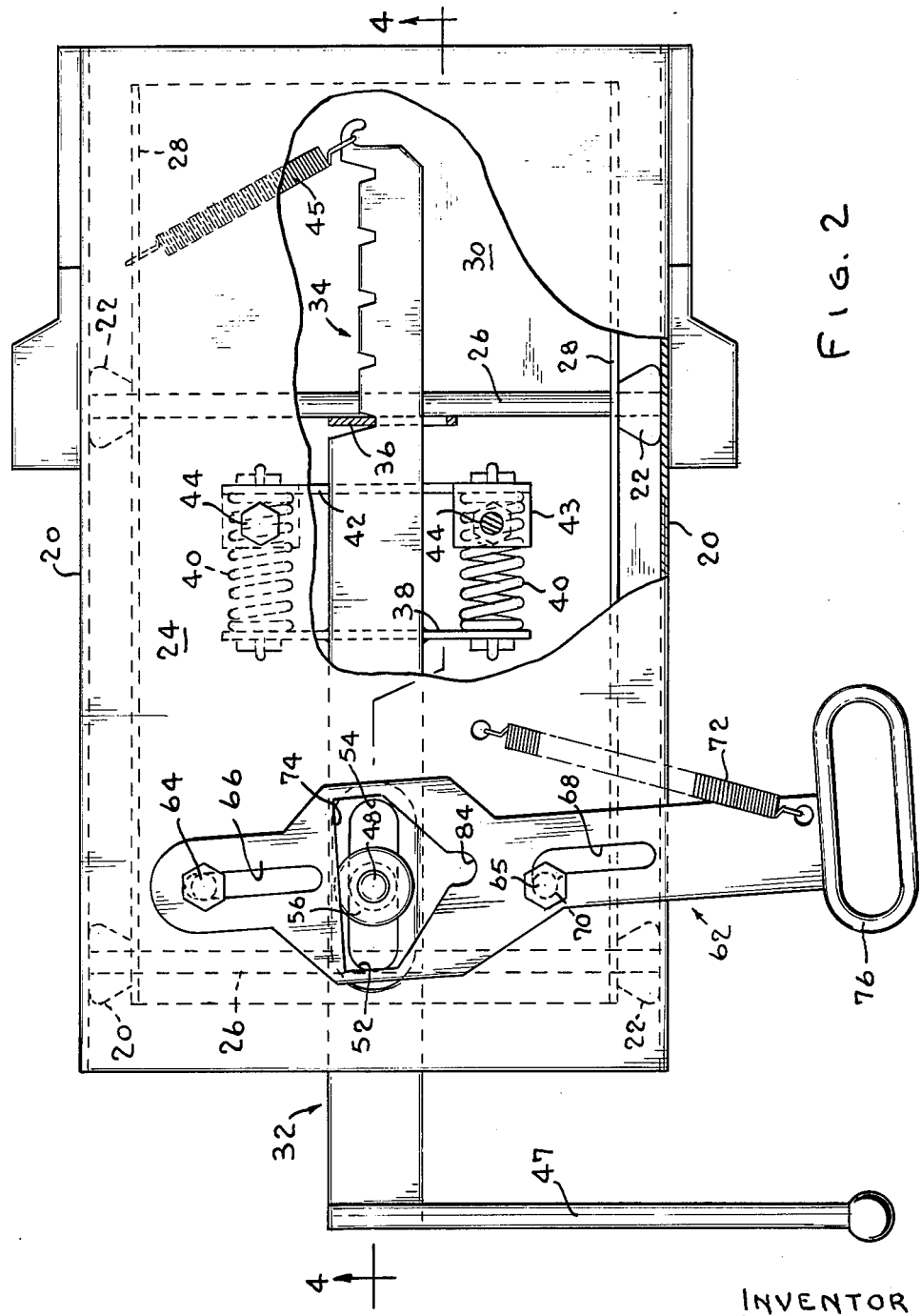

United States Patent Office 3,258,241
Patented June 28, 1966

3,258,241
VEHICLE SEAT SUSPENSION
William C. Oswald, Wauwatosa, Wis., assignor to Bostrom Corporation, Milwaukee, Wis., a corporation of Wisconsin
Filed Nov. 12, 1964, Ser. No. 410,551
14 Claims. (Cl. 248—430)

This invention pertains to adjustable vehicle seat suspensions and particularly to improvements in mechanisms for controlling the relative movement between a spring biased seat part and a base part of a vehicle seat.

The principal object of this invention is to provide means for controlling the oscillatory movement of a spring biased seat in respect to the base part without affecting a predetermined ride-position of the seat.

The ride-position of a seat may be defined as the static position of an occupied spring biased seat in respect to the maximum permissible amplitude limits of the oscillatory movement of the seat. In effect, the ride position is the relative static position of an occupied seat in respect to its spring means.

Essentially, two types of control over the oscillatory motion of the seat are contemplated. The first is the control over such motion when the seat position is adjusted to accommodate a particular size occupant, in which case the seat part as well as the location of its ride-position is changed in respect to the base part. The second is the control over the position of the seat at times when the spring means is locked-out to provide a direct connection between the seat and base parts.

When considering the fore and aft vibrational isolation of vehicle seats, the ride-position can be said to be independent of the weight of the occupant, and therefore, it is that position of the seat in respect to the spring means at which the latter is at its null position. Generally, stop means are provided which limits the maximum forward and backward movement of the seat from its ride-position, the ride position preferably being equal distant from the fore and aft stop means. In making a fore and aft position adjustment in seats of this type, it is important that the ride-position of the seat not be affected by the adjustment movement of the seat. Further, it is important that in instances where the occupant desires to lock-out the seat suspension, the direct tie to the base part be made when the seat is in the ride-position. This is important because the occupant adjusts the seat and its ride-position in respect to the base to the particular position best suited for him. Since the occupant will most likely desire to lock-out the spring suspension at times when the seat experiences severe bounding which renders control of the vehicle difficult, it is of course important that the seat be directly connected to base at the particular preselected position.

When considering vertical isolation it is equally important that the lock-out of the seat is made when the seat is in a predetermined ride-position.

The suspension embodying the present invention is capable of accomplishing the above described features with a rather compact and simple mechanism.

Essentially, the suspension embodying the present invention is comprised of a base part and a seat part which is mounted on rollers or similar antifriction means for movement in respect to the base part. Further, a control member is provided which limits both the normal position of the seat part and also limits the total permissible length of oscillatory motion of the seat part. The control member is fixed by adjustable connecting means to the base part and is connected through a spring to the seat part. This structure alone merely provides a bias to the oscillatory movement of the seat part, and permits the seat position to be adjusted without affecting the isolation. This feature has been obtained with prior art structures, as for example, with the structure shown in the Simons et al. Patent 2,392,342, assigned to the assignee of the present application. However, in the structure embodying the present invention the control member is also provided with a stop pin which reciprocates within a slot of the seat part during oscillatory movement of the seat part. The length of the slot limits the total permissible distance of the oscillatory motion. When the seat is in a static condition the spring connecting the control member and the seat part maintains the stop pin at a predetermined position within the slot to define the ride-position of the seat. The seat position can be changed by changing the position at which the control member is connected to the base. By providing the adjustment at this point, the position of the seat can be changed without changing the spring bias or ride-position.

Further, the suspension embodying the present invention is provided with a lock-out latch which can be actuated to capture the stop member of the connecting means and to fix it to the seat part at a predetermined position within the stroke of the seat part. Because of this feature, the occupant of the seat is able to render the biasing means inoperative in the event that he believes them to be detrimental to his operation of the vehicle. However, the lockout latch will provide the direct connection to the base part in such a manner that the fore-and-aft position of the seat will be at a predetermined position, and preferably at the position to which the seat had been adjusted by the operator.

In order to attain locking means which will lock the seat part at the predetermined position within the stroke, the latch is provided with guide sections which terminate in a central notch. When the back is actuated, the guide sections will be urged against the moving stop member, but the latch only engages the same as the pin is moved into the notch to thereby stop further oscillatory movement.

In view of the above, a further object of this invention is to provide a vibrationally isolated vehicle seat suspension and means which will render the isolation mechanism inoperative by directly connecting the vehicle seat to the base at a predetermined fore and aft position of the seat.

A further object of this invention is to provide a simple and very compact mechanism for attaining fore and aft isolation, fore and aft adjustment and lock-out of the isolation at any adjusted position.

The compactness of this mechanism is primarily attained by positioning the control members in the space between the seat part and base part which is necessitated by the antifriction means. Further features particularly material to attain this compactness will be best appreciated from the further description in this specification.

Other objects and advantages will be pointed out in, or be apparent from, the specification and claims, as will obvious modifications of the single embodiment shown in the drawings, in which:

FIG. 1 is a plan side view of a vehicle seat embodying the present invention;

FIG. 2 is a top plan view with portions broken away taken on line 2—2 of FIG. 1 and showing the control member fixed to the base part and the latching member in its unlocking position;

FIG. 3 is a view similar to that in FIG. 2 but showing the control member as it is actuated to adjust the seat position forwardly from the position shown in FIG. 2, and showing the latching member in its locking position;

FIG. 4 is a cross-sectional view taken on line 4—4 of FIG. 2;

FIG. 5 is a cross-sectional view taken on line 5—5 of FIG. 4;

FIG. 6 is a fragmentary cross-sectional view taken on line 6—6 of FIG. 3;

FIG. 7 is a fragmentary cross-sectional view taken on line 7—7 of FIG. 4; and

FIG. 8 is a fragmentary cross-sectional view taken on line 8—8 of FIG. 4.

Referring to the drawings in detail, FIG. 1 shows an overall side view of a vehicle seat equipped with the suspension embodying the present invention. The seat 10 is comprised of a seat cushion 12 and a back cushion 14 both of which are mounted on a seat frame 16. The seat 10 is mounted for controlled fore and aft motion on a base member 18 which in turn is fixed to the vehicle frame. In FIG. 1, essentially all of the structure of the present suspension structure is hidden by the side rails 20 of the seat frame which are in rolling contact with the rollers 22 of the base.

As shown in FIG. 5, the side rails 20 are formed on both sides of a generally rectangular seat frame member 24 and are in rolling contact with rollers 22. The rollers are mounted on a transversely extending shaft 26 which is fixed to the upstanding flanges 28 of the base platform 30. The seat cushions 12 and 14 as well as other frame components are fixed for movement with the plaform 24, and therefore, in the further description of this invention the position of the platform 24 will be indicative of the seat position.

The seat frame 16 and the base 18 are connected to each other by a control member 32. One end of the control member is fixed to the base by means of a rack 34 which is engaged with an upstanding catch 36 of the base platform 30. Intermediate its ends the control member 32 is provided with a downwardly extending flange 38 which is connected to one end of a pair of coil springs 40. The other end of the coil springs is connected to a similarly downwardly extending flange 42 of a bracket 43 which is fixed to the seat support platform 24 by bolts 44. The springs 40 bias the seat frame 16 to a ride-position. When the base is subjected to fore and aft vibration the springs 40 will be alternatively loaded in compression and tension to thereby provide vibrational isolation to the seat. The rack 34 permits the seat frame and control member to be moved as a unit between several fore and aft adjusted positions. Because of this, the relative position between the seat and the control member will remain constant and therefore the vibration isolation characteristics will be the same at any adjusted position of the seat. As seen in FIG. 3 the spring 45 may be connected to flange 28 and to the end of the rack to bias the rack into engagement with the stop 36, yet to permit the rack to be disengaged therefrom upon actuation of handle 47.

The total permissable amount of relative movement between the seat frame and base part is limited to the length of a slot 46 provided in the support platform 24. The slot receives an upstanding stop pin 48 which is fixed to the control member by a threaded connection at 50. With the parts in the ride-position, the pin 48 is positioned at the midpoint intermediate the ends 52 and 54 of the slot. When the vehicle seat is subjected to horizontal vibratory forces, the seat will oscillate in respect to the stop pin 48, however the total permissible forward as well as backward motion of the seat from the ride-position will be limited to a distance equal to one-half of the length of the slot. Slidable motion of the platform 24 in respect to the pin 48 is facilitated by anti-friction washers 56 and 58 which are positioned on opposing sides of the platform 24. The platform is depressed at 60 in order to position the washer 56 at a level even with the surface of the platform.

A lock-out latch 62 is transversely slidably mounted on the platform 24 by suitable bolts 64 and 65 which extend through slots 66 and 68 of the latch. The latch is normally positioned in the unlocking position (as shown in FIG. 2) in which case the bolt 65 is maintained in the transversely extending notch 70 by spring 72. When in this position, the elongated central cut-out portion 74 of the latch does not interfere with the relative movement between the seat frame and the base. In the event that the operator desires to eliminate fore and aft isolation he moves the handle 76 to the left (FIG. 2) to disengage the bolt 65 from the notch 70 and to permit the spring 72 to move the rack inwardly. Should the seat be at another position than the ride-position, one of the slanted guide surfaces 82 will be urged against the stop pin 48, and the latch will progressively move inwardly as the seat approaches its ride-position, at which time the central notch 84 will engage the pin to thereby provide a rigid connection between the seat and the control member and thus the seat and its base.

Although but a single embodiment of the present invention has been illustrated and described, it will be apparent to those skilled in the art that various changes and modifications may be made therein without departing from the spirit of the invention or from the scope of the appended claims.

I claim:

1. A seat suspension comprising:
   a base part;
   a seat part mounted on said base part for relative fore and aft movement in respect to said base part;
   a control means fixedly connected to said base part and connected through biasing means to said seat part to thereby provide a biased opposing force to movement of said seat part away from a predetermined ride-position in respect to said control means;
   stop means having one member movable with said seat part and another member movable with said control means, said stop means limiting the permissible total fore and aft movement of said seat part in respect to said control means and also limiting the total permissible movement of said seat part from said ride-position in the fore and in the aft direction;
   adjustable connecting means connecting said control means to said base part to fixedly connect said control means at a plurality of fore and aft spaced locations in respect to said base part and thereby vary the fore and aft location of said seat part and its ride-position in respect to said base part without affecting said biased opposing forces nor said total permissible movement of said seat part in the fore and aft direction from said ride-position.

2. A seat suspension according to claim 1, wherein one of said stop means members comprises a fore and aft extending aperture, and the other of said members comprises pin means operable to reciprocally travel in said aperture in accordance with the relative movement of said seat part in respect to said control member, said pin means being operable to stop said relative motion in one direction when encountering the end of said aperture.

3. A seat suspension according to claim 2, wherein roller means are provided between said seat and base parts on each side of said suspension, and wherein said control means are positioned in the central space defined on top and bottom by said seat and base parts respectively and on the sides by said roller means.

4. A seat suspension comprising:
   a base part;
   a seat part mounted for relative fore-and-aft movement in respect to said base part;
   a control member fixedly connected to said base part by connecting means and to said seat part by spring means to thereby provide a biased opposing force to movement of said seat part away from a ride-position of said seat part in respect to said control member;
   stop means having one stop member movable with said seat part and another stop member movable with said control means, said stop means limiting the permissible total fore and aft movement of said seat part in respect to said control member, the relative position of said stop members in respect to each other at said ride-position limiting the permissive total fore and aft movement of said seat part away from said ride-position;

adjustment means to vary the fore and aft location at which said control member is fixedly connected to said base part to thereby vary the fore and aft position of said seat part in respect to said base part without affecting said stop means nor said spring means;

locking means connected to one of said stop members and movable from an unlocking position to a locking position at which it intercepts the movement of said other stop member and rigidly connects the same to said one stop member to thereby prevent any fore and aft motion of said seat part in respect to said base part; and means to move said locking means to the unlocking position to thereby render said spring means and stop means effective to control the fore and aft motion of said seat part in respect to said base part.

5. A seat suspension according to claim 4 wherein said locking means is provided with means which permits said locking means to rigidly connect said stop members only when said seat part is at said ride-position.

6. A seat suspension comprising:
a base part;
a seat part mounted for relative fore and aft movement in respect to said base part;
biasing means affecting said relative fore and aft movement;
a control member fixedly connected to said base part by connecting means and to said seat part by said biasing means which provides a biased opposing force to movement of said seat part away from a predetermined ride-position in respect to said control member;
locking means actuable while said seat part is oscillating in the fore and aft direction and operable to lock said seat part to said control member as said part reaches said ride-position; and
adjustment means to vary the fore and aft location at which said control member is fixedly connected to said base part to thereby vary the fore and aft position of said seat part in respect to said base part without affecting said biasing means nor said locking means.

7. A seat suspension comprising:
a base part;
a seat part mounted for uni-planar relative oscillatory movement and adjustment movement in respect to said base part;
biasing means resiliently resisting said oscillatory movement;
a control member fixedly connected to said base part by connecting means and to said seat part by said biasing means, said biasing means providing an opposing force to movement of said seat part away from a predetermined position of said seat part in relation to said control member;
locking means actuable while said seat part is oscillating in respect to said base part and operable to lock said seat part to said control member as said seat part reaches said predetermined position in relation to said control member; and
adjustment means to vary the location at which said control member is fixedly connected to said base part to thereby provided said adjustment movement of said seat part in respect to said base part without affecting said forces of said biasing nor said locking means.

8. A seat suspension according to claim 7, including stop means which limits maximum permissible relative movement of said seat part in respect to said control member to a predetermined distance away from said predetermined position.

9. In a seat suspension having a seat mounted for oscillatory movement in respect to a base part, means for selectively stopping the oscillatory motion when the parts are at a predetermined relative position in respect to each other, said means comprising:
a projecting stop member connected to one of the parts for movement therewith in a predetermined path in respect to the other of the parts;
a locking member connected to said other part and movable in respect thereto between locking and unlocking positions;
means for maintaining said locking member in said unlocking position to permit said movement of said stop member;
means for moving said locking member away from said unlocking position and for urging said locking member into the path of said stop member, said locking member having a notch section which is operable to engage said stop member when said parts are at the predetermined relative position and to prevent further movement of said stop member, and said locking member having guide means which is urged against said stop means as said locking member is urged into the said path yet which permits relative movement between said locking and stop members until said notch section engages said stop member.

10. The combination according to claim 9, wherein said locking member is comprised of a plate slidably mounted on said other part for movement between said locking and unlocking positions, and wherein said locking member is provided with a cutout section in which said stop member reciprocates during the oscillatory movement between said parts, said cutout section having a slanted portion which comprises said guide means and which is oblique to said path of travel and leads to said notch to thereby permit said notch to be guided into said path of travel as said parts move towards said predetermined relative position.

11. The combination according to claim 9, wherein said maintaining means for said plate is comprised of a second notch and notch engaging means, and wherein said moving means for said plate is comprised of a spring normally urging said plate towards said stop member, said second notch and engaging means cooperating to maintain said plate in said unlatched position and being disengagable in response to a pivotal movement of said plate in respect to said second part to thereby permit said spring to move said plate towards said stop means and to urge said slanted portion and notch against said stop means.

12. A seat suspension comprising:
a base part;
a seat part mounted for relative fore and aft oscillatory movement in respect to said base part;
a control member fixed to said base part at one of a plurality of fore and aft positions relative to said base part;
spring means connected between said control member and said seat part operable to resiliently resist said oscillary movement and locating said seat in a predetermined ride-position in respect to said control member;
a projecting stop member fixed to said control member and received in an elongated aperture provided in said seat part, said stop member being positioned intermediate the ends of said aperture when said seat part is in said ride-position and being operable to engage the seat part at the ends of said aperture to thereby limit the permissible maximum fore and aft movement of said seat part in respect to said control member;

a latching member connected to said seat part and movable between unlatching and latching positions, said latching member being operable in said engaged position to engage said stop member to thereby prevent any movement between said seat part and said control member.

13. A seat suspension according to claim 12, wherein said latching member has means to engage said stop member when said seat part is in said ride-position.

14. A seat suspension according to claim 13, including adjustment means to vary the location at which said control member is fixed to said base member to thereby permit fore and aft adjustment movement of said seat part without affecting said biasing means nor the cooperation between said stop member and latching means.

References Cited by the Examiner
UNITED STATES PATENTS

| | | | |
|---|---|---|---|
| 2,932,342 | 4/1960 | Simons et al. | 248—430 |
| 3,100,617 | 8/1963 | Radke et al. | 248—430 |

CLAUDE A. LE ROY, *Primary Examiner.*

R. P. SEITTER, *Assistant Examiner.*